US012397184B2

(12) United States Patent
Muhammad et al.

(10) Patent No.: US 12,397,184 B2
(45) Date of Patent: Aug. 26, 2025

(54) WALL-MOUNTED SPRAY HEAD UNIT

(71) Applicant: Plumis Ltd., London (GB)

(72) Inventors: Yusuf Muhammad, London (GB); William Makant, London (GB)

(73) Assignee: PLUMIS LTD, London (GB)

( * ) Notice: Subject to any disclaimer, the term of this patent is extended or adjusted under 35 U.S.C. 154(b) by 372 days.

(21) Appl. No.: 17/264,914

(22) PCT Filed: Jul. 26, 2019

(86) PCT No.: PCT/GB2019/052103
§ 371 (c)(1),
(2) Date: Feb. 1, 2021

(87) PCT Pub. No.: WO2020/025934
PCT Pub. Date: Feb. 6, 2020

(65) Prior Publication Data
US 2021/0299494 A1 Sep. 30, 2021

(30) Foreign Application Priority Data
Aug. 1, 2018 (GB) .................................... 1812557

(51) Int. Cl.
*A62C 31/28* (2006.01)
*A62C 31/24* (2006.01)
*A62C 37/10* (2006.01)

(52) U.S. Cl.
CPC .............. *A62C 31/28* (2013.01); *A62C 31/24* (2013.01); *A62C 37/10* (2013.01)

(58) Field of Classification Search
CPC .... A62C 31/24; A62C 31/28; A62C 37/08–11
USPC ............................................ 169/51, 60, 61
See application file for complete search history.

(56) References Cited

U.S. PATENT DOCUMENTS 4,821,805 A * 4/1989 Saito ...................... A62C 37/00 169/61
5,727,634 A * 3/1998 Ishida .................... A62C 31/05 169/61
2009/0184244 A1* 7/2009 Drews ...................... A62B 3/00 250/330
(Continued)

FOREIGN PATENT DOCUMENTS

GB 2533262 A * 6/2016 ............. A62C 31/03
JP 2002172184 A * 6/2002
(Continued)

OTHER PUBLICATIONS

Bibliographic data, including English abstract, Pub. No. KR 10-2012-0010715, 1 page.

*Primary Examiner* — Cody J Lieuwen
(74) *Attorney, Agent, or Firm* — Francis J. Maguire; WARE FRESSOLA MAGUIRE & BARBER LLP

(57) ABSTRACT

A wall-mountable spray head unit for delivering a fire suppressant liquid is disclosed. The spray head unit includes a rotatable spray head assembly having a spray manifold rotatable about a first axis, and a spray nozzle supported by the spray manifold and orientated to deliver fire-suppressant material radially in a plane defined by the first axis and a second axis which is perpendicular to the first axis. The spray head unit also includes one or more fire-locating, sensors including a visible-light camera, a microphone, or both.

30 Claims, 14 Drawing Sheets

(56) References Cited

U.S. PATENT DOCUMENTS

| | | | | |
|---|---|---|---|---|
| 2011/0031331 | A1* | 2/2011 | Klicpera | G01F 15/0755 239/71 |
| 2013/0098478 | A1* | 4/2013 | Kling | A62C 33/00 137/551 |
| 2015/0036037 | A1* | 2/2015 | Reed | G03B 17/02 348/340 |
| 2015/0169984 | A1 | 6/2015 | Newton et al. | |
| 2016/0271434 | A1* | 9/2016 | Dusing | H04L 67/12 |
| 2017/0319882 | A1 | 11/2017 | Hart et al. | |
| 2018/0221694 | A1* | 8/2018 | Shively | A62C 31/22 |

FOREIGN PATENT DOCUMENTS

| | | | | | |
|---|---|---|---|---|---|
| JP | 2013041604 | A | * | 2/2013 | |
| KR | 10-2012-0010715 | A | | 2/2012 | |
| WO | WO-2017191443 | A1 | * | 11/2017 | A62C 31/02 |

* cited by examiner

WALL-MOUNTED SPRAY HEAD UNIT

FIELD OF THE INVENTION

The present invention relates to a wall-mounted spray head unit for delivering a fire suppressant liquid and to a fire suppression system comprising at least one wall-mounted spray head unit.

The present invention also relates to a wall-mounted unit for a control hub for a building or part of a building, such as a home, office, shop, hospital or other venue used by people.

BACKGROUND

A fire-suppression system which uses a targeted water mist spray offers an effective alternative to a conventional sprinkler system. Such a system offers a range of benefits. For example, it can operate with a much-reduced water flow requirement compared to a conventional sprinkler system and, thus, can cause less water damage when activated. The system can be easier, cheaper and less disruptive to retrofit in an existing property. An example of such a fire suppression system can be found in WO 2017/191443 A1.

SUMMARY

According to a first aspect of the present invention there is provided a wall-mountable spray head unit. The spray head unit comprises a rotatable spray head assembly comprising a spray manifold rotatable about a first axis, and a spray nozzle supported by the spray manifold and orientated to deliver fire-suppressant material (such as water or an aqueous solution) radially in a plane defined by the first axis and a second axis which is perpendicular to the first axis. The spray head unit also comprises one or more fire-locating sensors for guiding the rotatable spray head assembly. The one or more fire-locating sensors include a visible-light camera and/or a microphone.

Thus, the visible-light camera and/or microphone can be used to sense and locate non-thermal signs of fire, such as the appearance of smoke and/or the sound of fire (for example in the form of crackle and/or hiss).

Preferably, the one or more fire-locating sensors is/are directed in the plane. Thus, the sensors can move with the spray nozzle.

The visible-light camera may comprise a lens and a hydrophobic coating on the lens. The spray head unit may further comprise a thermal sensor directed in the plane.

Thus, the thermal sensor can be used to confirm the presence of fire.

The visible-light camera and/or microphone may be mounted on the spray manifold so as to move with the spray nozzle.

The first axis may be a substantially vertical axis and the plane may be a substantially vertical plane. The spray manifold may be only rotatable about the first axis.

The spray head unit may further comprise an output device, such as a display, and a controller or input configured to cause the output device to output real-time information. This can help encourage inspection of the spray head unit and, thus, help ensure that the spray head unit is in working order. The output device may be a speaker. The spray head unit may comprise more than one different types of output device.

The head unit may comprise a spray nozzle. There may be first and second paths to the spray nozzle for delivering first and second liquids to the spray nozzle. The first and second liquids may be different. For example, the first liquid may be water and the second liquid may be a perfume, a fire suppressant material or a marker, or a mixture containing water and a fire suppressant material or a marker.

The head unit may comprise at least two spray nozzles. A first spray nozzle of the at least two spray nozzles may deploy a first liquid of a first droplet size and a second nozzle may deploy a second liquid of a second droplet size. The first and second liquids may be different. For example, the first liquid may be water and the second liquid may be a perfume, a fire suppressant material or a marker, or a mixture containing water and a fire suppressant material or a marker. The first and second droplet sizes may be different. For example, a first nozzle may deploy droplets of water or a mixture containing water of a relatively small size and a second nozzle may deploy droplets of water or a mixture containing water of a relatively large size.

Droplet size of about 0.020 inches (0.5 mm) can be used for systems using very high water volume. This can be used in low-pressure misting systems.

Droplet size of about 0.016 inches (0.4 mm) can be used for systems where airflow and clearance allow for complete evaporation and where higher water volume is used. This can be used in low- and medium-pressure misting systems.

Droplet size of about 0.012 inches (0.3 mm) can be used for most systems. It can be used in both open and enclosed areas with complete evaporation. It provides similar results to the 0.008 inch nozzle, but with more water. This can be used in medium-pressure misting systems.

Droplet size of about 0.008 inches (0.2 mm) can be used to help reduce the volume of water used. It results in less moisture and can encourage evaporation. This can be use in high-pressure misting systems, generally at or above 250 psi/17 bar (1,700 kPa).

Droplet size of about 0.006 inches (0.15 mm) can be used for help reduce the volume of water used still further. This can be use in high-pressure misting systems, generally at or above 500 psi/34 bar (3,400 kPa).

The wall-mountable spray head unit may include a wireless network interface, for example, to enable wireless connection via WiFi and/or mobile phone network.

The wall-mountable spray head unit may include a replaceable reservoir or a fillable reservoir for holding an additive. The wall-mountable spray head unit may be configured to controllably add the additive to the fire-suppressant material. The additive may be a wetting agent. The additive may be a perfume.

According to a second aspect of the present invention there is provided a wall-mountable spray head unit. The wall-mountable spray head unit comprises a rotatable spray head assembly which comprises a spray manifold rotatable about a first axis and a spray nozzle supported by the spray manifold and orientated to deliver fire-suppressant material radially in a plane defined by the first axis and a second axis which is perpendicular to the first axis, one or more fire-locating sensors, an output device and a controller configured to cause the output device to output real-time information.

The real-time information may include a current time and/or weather report. The real-time information may include information regarding a system check. The real-time information includes directions, for example, regarding fire escape.

The real-time information may include a heat map and, optionally, an image of the room with the heat map. This can be used to help manage energy use by identifying cold spots and/or hot spots and so allow a user to take corrective measures.

The spray head unit may have different modes and the controller may be operable to output different information in different modes.

The spray head unit may further comprise an input device, such as a push button or a touch switch. The input device may be a touch screen or panel. This can help encourage use of the spray head unit and, thus, help ensure that the spray head unit is in working order.

The spray head unit may be configured to determine whether a user, in response to a prompt, has provided an input to the input device, optionally, within a given time period. The prompt may be provided via the output device comprised in the spray head unit or via a mobile device, e.g. via a text, e-mail or other notification.

The spray head unit may comprise a controller configured to deploy fire-suppressant material in response to a trigger. A threshold for the trigger depends on an angle of rotation of the spray manifold. For example, a lower threshold may be used close to a wall, for instance up to 200.

According to a third aspect of the present invention there is provided a wall-mountable spray head unit. The wall-mountable spray head unit comprises a rotatable spray head assembly which comprises a spray manifold rotatable about a first axis and a spray nozzle supported by the spray manifold and orientated to deliver fire-suppressant material radially in a plane defined by the first axis and a second axis which is perpendicular to the first axis, one or more fire-locating sensors, a controller configured to cause deployment of fire-suppressant material in response to a trigger, wherein a threshold for the trigger depends on an angle of rotation of the spray manifold.

The spray head unit may comprise a controller configured to deploy fire-suppressant material in response to a triggering event at a first angular position. The controller may be configured to deploy the fire-suppressant material at a second, different, predetermined angular position before the first angular position. This can be used to deploy protective cover or a barrier for a high-risk or high-worth article, such as a gas pipe.

According to a fourth aspect of the present invention there is provided a wall-mountable spray head unit. The wall-mountable spray head unit comprises a rotatable spray head assembly which comprises a spray manifold rotatable about a first axis and a spray nozzle supported by the spray manifold and orientated to deliver fire-suppressant material radially in a plane defined by the first axis and a second axis which is perpendicular to the first axis, one or more fire-locating sensors, a controller configured to deploy the fire-suppressant material at a second, different, predetermined angular position before the first angular position.

A subject or article of importance may be located at the second, different angular position. Thus, deployment of the fire-suppressant material can be used to provide a protective cover over the high-risk or high-worth article, or subject (e.g., a person or animal).

The second, different angular position may intersect the first angular position and a third angular position at which a subject or article is located. Thus, deployment of the fire-suppressant material can be used to provide a protective barrier between the fire and the high-risk or high-worth article, or subject.

According to a fifth aspect of the present invention there is provided a system comprising a wall-mountable spray head unit comprising a rotatable spray head assembly which comprises a spray manifold rotatable about a first axis and a spray nozzle supported by the spray manifold and orientated to deliver fire-suppressant material radially in a plane defined by the first axis and a second axis which is perpendicular to the first axis, and one or more fire-locating sensors for locating a fire in a room, the one or more fire-locating sensors including a thermal sensor, wherein the room is scannable with the thermal sensor so as to generate a heat map of the room.

Thus, the wall-mountable spray head unit can be used not only as a safety device, but also as an energy management tool.

The wall-mountable spray head unit may gather and optionally record information about location of occupants (which may be identified since they have a heat signature).

This information may be provided to a display or transmitted to a remote device, such as a portable computer (for example in the form of a tablet computer), which can be used to help guide fire fighters.

The wall-mountable spray head unit may gather and optionally record information about heat profile for a room. This information may be provided to a display or transmitted to help control air flow in a building for smote venting. The information may be provided to a ventilation system controller for controlling air flow in a building.

The wall-mountable spray head unit may include a wireless network interface, for example, to enable wireless connection via WiFi and/or mobile phone network.

The wall-mountable spray head unit may further comprise a display, wherein the wall-mountable spray head unit is configured to show the heat map.

The wall-mountable spray head unit may further comprise a network interface for transmitting the heat map to a remote location.

According to a sixth aspect of the present invention there is provided a method of locating a fire using a unit comprising a temperature sensor mounted on a rotatable support. The method comprises performing a first scan by rotating the support between first and second angular limits (for example, 250 and 1550 respectively) and recording a temperature at each of a plurality of angles to obtain a first measurement of temperature against angle. The method comprises determining whether any temperature in the first measurement exceeds a predetermined threshold and, upon a positive determination, causing deployment of fire suppressant material. The method comprises performing a second scan by rotating the support between the first and second angular limits and recording a temperature at each of a plurality of angles to obtain a second measurement of temperature against angle. The method comprises comparing a temperature for each angle in the first measurement with a temperature for a corresponding angle in the second measurement and determining whether the difference exceeds a predetermined threshold and, upon a positive determination, causing deployment of fire suppressant material. The method may further comprise comparing the temperature differences with temperature difference from another different unit and determining whether a temperature differences from the other unit is larger and flagging a result of the determination.

The method may further comprise smoothing the function.

According to a seventh aspect of the present invention there is provided a computer program comprising instructions which, when performed by a processor, causes the processor to perform the method.

According to an eighth aspect of the present invention there is provided a computer program product comprising a computer-readable medium (e.g. a non-transitory computer-readable medium, such as memory) storing the computer program.

According to a ninth aspect of the present invention there is provided a wall-mounted unit for a control hub for connected devices in a building or part of a building. The wall-mounted unit preferably comprises at least one spray nozzle for delivering fire-suppressant material (such as water or an aqueous solution). The spray head unit comprises one or more sensors for gathering thermal information for a room or space, and an output device for providing a user with information and an input device for receiving a user input.

According to a tenth aspect of the present invention there is provided a system comprising the wall-mounted unit, a controller in communication with the wall-mounted unit and a wireless interface. The wireless interface may be integrated into the wall-mounted unit or controller.

BRIEF DESCRIPTION OF THE DRAWINGS

Certain embodiments of the present invention will now be described, by way of example, with reference to the accompanying drawings, in which.

DETAILED DESCRIPTION OF CERTAIN EMBODIMENTS

Fire Protection System 1

Figure 1:
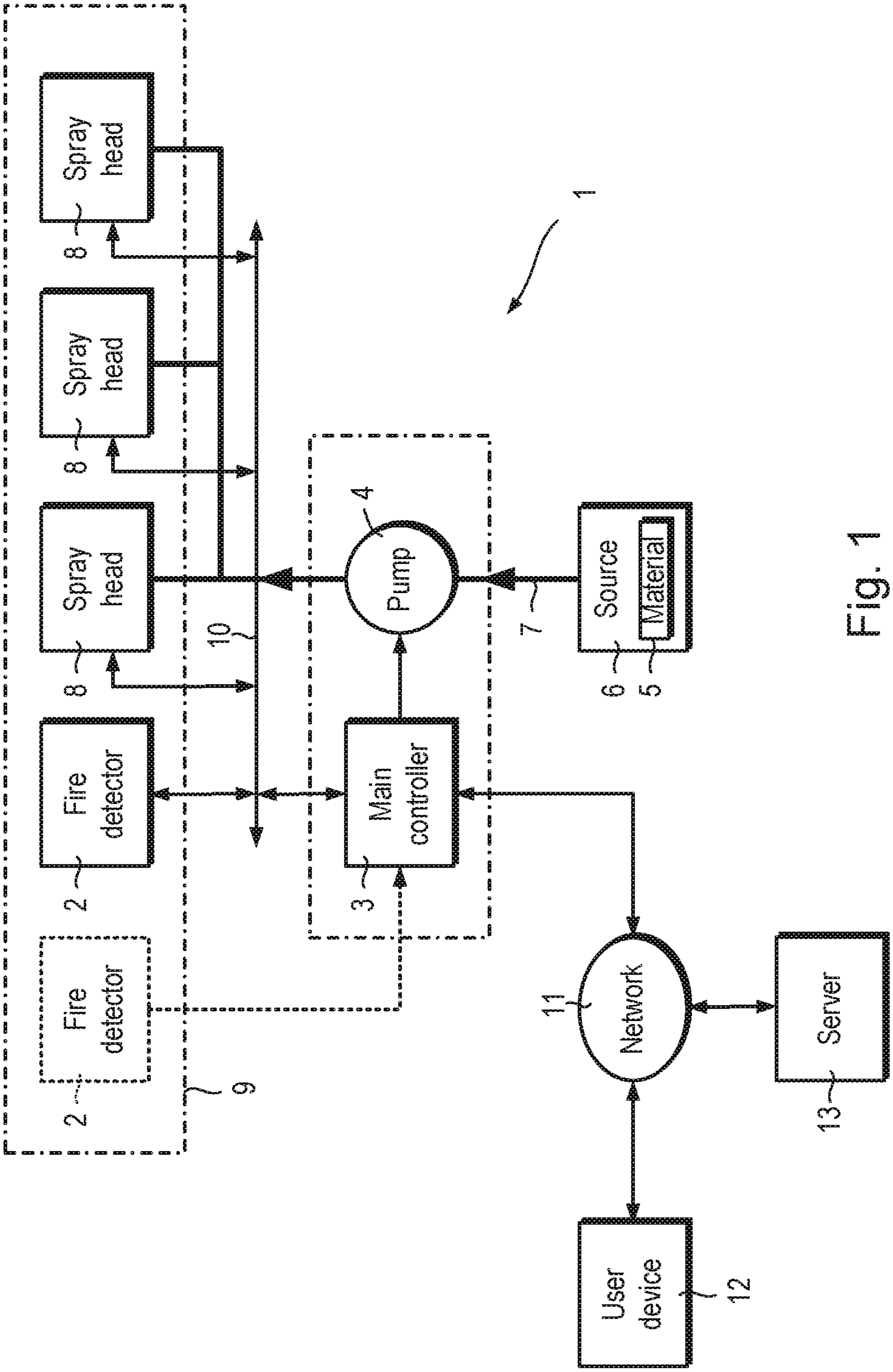
FIG. 1 is a schematic block diagram of a fire suppression system which includes one or more spray heads for spraying fire-suppressant material.

Referring to FIG. 1, a fire protection system 1 (which may also be referred to as a "fire suppression system") is shown. As will be explained in more detail later, although the system 1 is intended to provide fire protection, it can also be used for other purposes, in particular, for heat management of a building or part or of a building, such as house or apartment.

The system 1 includes at least one fire detector 2, a main controller 3, one or more pressure generators 4 (or "pumps") for supplying fire suppressing material 5, in this example water, from a source 6 via piping 7 to at least one rotatable spray head assembly 8 (herein also referred to simply as a "spray head"). The main controller 3 may be omitted or its functions may be implemented by the spray heads 8. The fire detector 2 and the spray head(s) 8 may be co-located in one space 9, for example, a room. The fire detector 2, main controller 3 and/or spray head(s) 8 are connected by a communication network 10, for example, an Ethernet-over-powerline network. The system 1, however, may include dedicated point-to-point communication link(s) (not shown). For example, the fire detector 2 and main controller 3 may be connected by a separate, dedicated wired link. The general principle of operation of the system is described in WO 2010/058183 A1 and WO 2017/191443 A1 which are incorporated herein by reference.

The system 1 is connected to a network 10, for example, the Internet. This can allow a user device 12, such as a mobile phone, tablet, laptop computer or other form of computer, to access the system 1 or a server 13 which can serve information about the system 1 to the user device 12.

Figure 2:
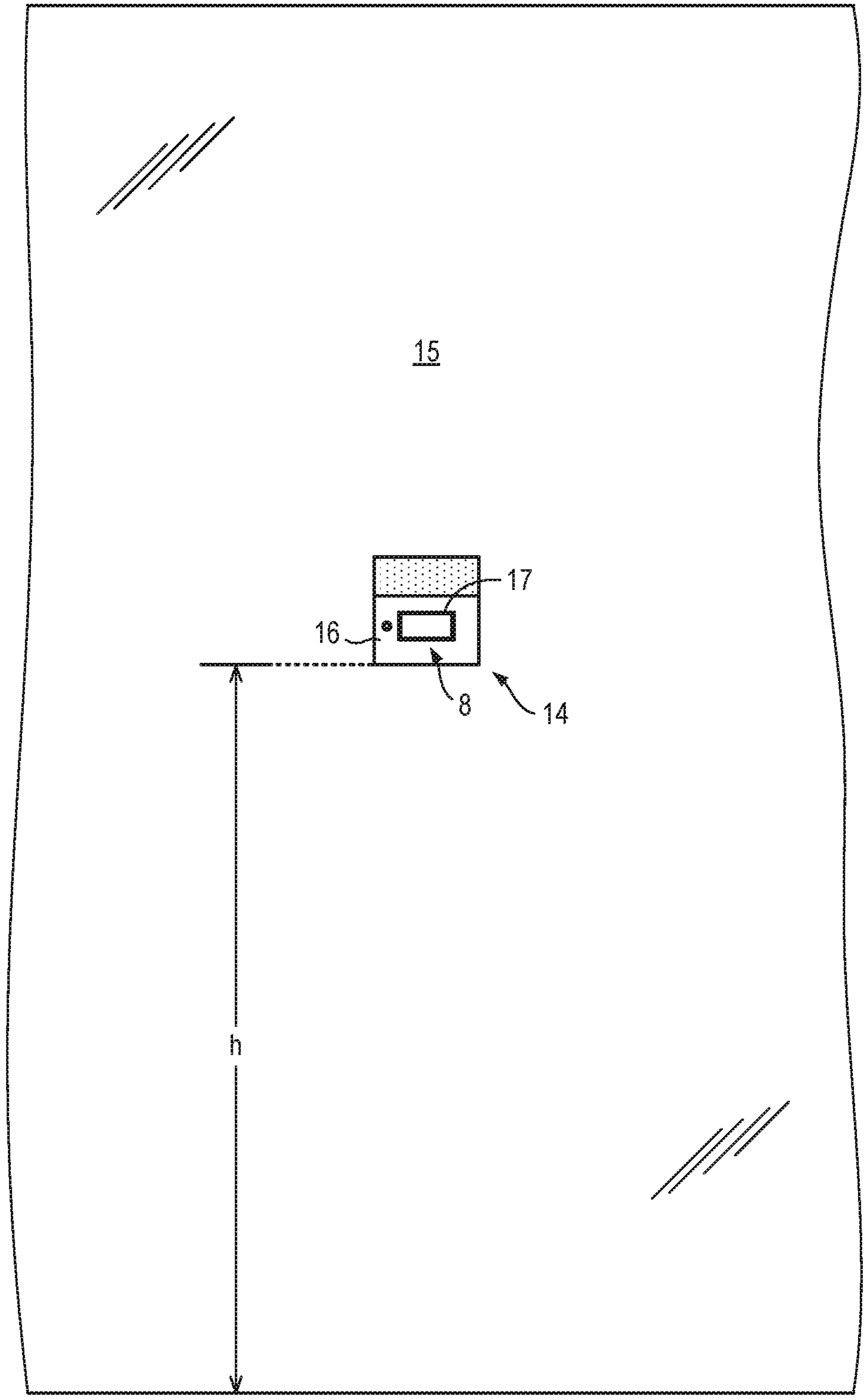
FIG. 2 is a schematic view of a spray head unit and a wall.

Referring also to FIG. 2, each spray head 8 forms part of a spray head unit 14 which is mounted to a wall 15 at a height, h, about 120 to 160 cm from the ground. When the system 1 is activated, the spray head 8 rotates and the pressure generator(s) 4 delivers water 5 at high pressure, in this example about 80 bar (8 MPa), and the spray head 8 sprays a fine mist of water (herein referred to as "water mist").

Multiple spray head units 14 co-operate to suppress a fire using targeted jets of watermist. The pressure generator(s) 4 provide the pressure on demand to allow watermist to be created by one or more of the multiple spray heads 8.

Further details about the spray head unit 14, in particular the mechanical construction, can be found in WO 2017/191443 A1 which is incorporated herein by reference.

As will be explained in more detail later, the system 1 can be used for safety-related applications. For example, it can provide emergency signage in the case of fire, early warning alarm (for example, warning of a possible fire in given zone), and/or provide fire prediction by monitoring temperatures. The system 1 can provide maintenance alerts, be used to provide remote room visibility assessment, provide automatic fire service notification, and/or even be used to help find locate occupants in the home in the case of an emergency.

The spray head unit 14 can be used as a user interface unit for a control hub ("smart home hub") for connected devices in a building or part of a building. It can be used for temperature monitoring and temperature control. The spray head unit 14 can be employed for user testing and verification and for fire safety planning. Enhancing functionality of the spray head unit 14 can increase user engagement. Increasing user engagement can promote uptake of the system 1 and can help ensure that the system 1 is maintained.

The system 1 can also be used for non-fire-related applications.

The system 1 can be adapted and used to deploy a security marker. In particular, the system 1 may include first and second paths (not shown) between a water inlet (not shown) and pump each path individually selectable. The second path may be provided with a reservoir (not shown) for holding a marker (not shown) and a mixer unit for adding the marker to water. Further details can be found in WO 2015/49500 A1 which is incorporated herein by reference.

Additionally or alternatively, the system 1 can be adapted and used to be used a humidifier. Similar a security marker arrangement, the system 1 may include an additional path (not shown). The additional second path may be provided with a reservoir (not shown) for holding a perfume (not shown) and a mixer unit for adding the perfume to water. The spray head unit may operate at a different pressure. In some embodiments, the spray head unit 14 may include an additional nozzle (not shown).

The system 1 may be connected to a heating, ventilation and air conditioning (HVAC) system (not shown). The spray head control unit 25 (FIG. 3) may control a heater (for example, in the form of an air-conditioning unit, a radiator, a boiler for a radiator system) or cooler (for example, in the form of an air-conditioning unit or an electric fan). Thus, the spray head unit 14 (FIG. 3) can supplement or replace existing room thermostats.

Wall-Mountable Spray Head Units

The fire suppression system 1 includes multiple wall-mountable spray head units 14 with rotatable spray head assemblies 8.

Figure 3:
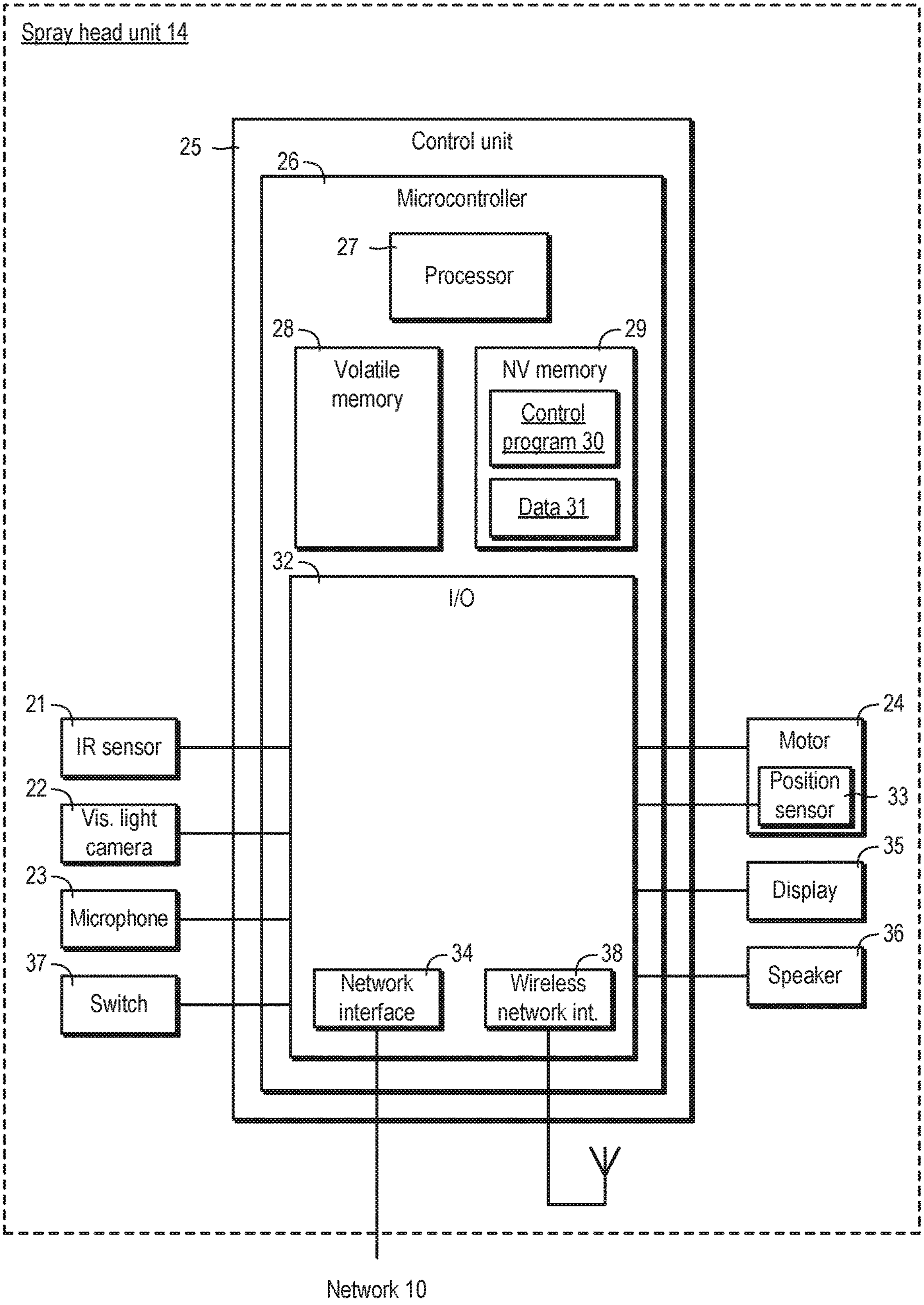
FIG. 3 is a schematic block diagram of a spray head unit.

Referring still to FIG. 2 and also to FIG. 3, each spray head unit 14 comprises a faceplate 16 having an aperture 17 and a main enclosure portion 18 (FIG. 15) which sits in a recess in the wall 15.

The spray head unit 14 comprises a rotatable spray head assembly 8 which can turn on one, vertical axis. The rotatable spray head assembly 8 comprises an elongate box-shaped manifold 19 (FIG. 5), a spray nozzle 20 (FIG. 5), and a set of one or more sensors 21, 22, 23 aligned with the nozzle 20.

The rotatable spray head assembly 8 is mounted on a base (not shown) and is driven by an actuator 24 (FIG. 3). Details of the spray head unit 14, such as the structure of the rotatable spray head 8 and its operation, can be found in WO 2017/191443 A1 ibid.

As will be explained in more detail later, the sensors 21, 22, 23 can include a thermal sensor 21, for example, in the form of an infrared pyrometer or infrared array sensor (for instance, with 4×4 pixels). The sensors 21, 22, 23 include a visible-light camera 22 and/or a directional microphone 23 for detecting non-thermal signs of fire, such as the appearance of smoke and/or the sound of fire (for example in the form of crackle and/or hiss) which can help to identify the presence of a fire early.

Referring in particular to FIG. 3, each spray head unit 14 includes a control unit 25 which includes a spray head controller 26 in the form of a microcontroller having at least one processor 27, volatile 28 and non-volatile memory 29 which stores a control program 30 and data 31 (such as set-point data, calibration data and/or logged data) and an input/output module 32 which is in communication with sensors 21, 22, 23 and actuator 24 which is used to rotate the spray head 8. The motor 24 preferably includes a position sensor 33, i.e. for sensing azimuthal angle of the spray head. The input/output module 32 includes an interface 34 to the communication network 10. The communications network interface 34 may be a power line signalling interface.

Each spray head unit 14 includes a thermal sensor 21, a visible-light camera 22 and/or a microphone 23. Each spray head unit 14 also includes at least one output device 35, for example in the form of a display 35, such as an LCD or OLED screen, and which may be a touch display. Each spray head unit 14 may also include other output devices, such as a speaker 36. Each spray head unit 14 also includes an input device 37, for example, in the form of a push button. Each spay head unit 14 may include a wireless network interface 38 for providing an interface to one or more wireless networks such as WiFi, a mobile phone network and BlueTooth (RTM). This can help enable the controller unit 25 to connect to other connectable devices such as thermostats. The spray head unit 14 to be used a controller (or "smart hub") for the building or part of the building.

The rotatable head assembly 8 can be swept back and forth under the control of software 30 to cause the head to be pointed at a wide range of locations within a room. As will be explained in more detail hereinafter, the head assembly 8 need not always be oriented and water mist deployed first at the fire, at an angle (or "first angular position"). Instead, the water mist can be oriented at an important object or subject so as to cover the object or subject in water first, or to lay down a protective barrier between the fire and the object or subject.

The visible-light camera 22 or microphone 23 can be used to identify the presence of a fire. For example, image recognition software can be used to identify flame or smoke. Suitable image recognition software is FireVu 500 (RTM) available from FireVu (Northwich, UK). Similarly, sound recognition software can be used to identify crackle or hiss, and suitable sound recognition software is ai3 (RTM) available from Audio Analytic (Cambridge, UK).

The spray heads 14 can be linked to an activating alarm and can start scanning. A scan may include measurement of temperature at each point in an are with the head facing at an angle of 25 to 155° from parallel with the wall 15 of installation. The measurements in a scan can be smoothed using a convolutional filter to reduce the effects of temperature sensor jitter and moving bodies within the room.

A first scan can establish a baseline temperature for each angle of the scan which is used to calculate a differential increase on following scans. An exceptionally high-temperature reading may cause an activation following the first scan. Subsequent scans measure the increase in temperature for each angle of the scan. Once the temperature at an angle exceeds a threshold that head is deemed to have successfully located a fire. All heads which locate a fire during a scan are then compared to see which has the best view. Selection is based on the highest temperature differential observed.

Each spray unit 14 may include a valve, for example, as described in WO 2017/191443 A1, or in a separate manifold to direct flow of fire-suppressant material where it is required. One or more devices 103, 104 (FIG. 18), for example in the form of a venturi device, a second pressure generator, or valve control, can be used to supply additional additive, such as security marker and/or perfume.

As will be explained in more detail, the system can be used to provide a mist for cooling, a fine mist for watering plants, acting as a humidifier, to provide perfume or room fragrances, or to provide a security tagging agent, may be even industrial cleaning, or as a humidifier.

The spray head unit 14 can be used as a home hub. It can be connected to other smart home devices, for example, via network interface 34 or via wireless network interface 38. For example, the system 1 can be connected to a smart thermostat (not shown) or a smart alarm system (not shown). The spray head 8 may be connected to the Internet to display information and or alert emergency services or an insurer via WiFi or wireless network interface 38 in the spray head unit 14.

Displays

A fire-suppression system can benefit from being inspected at regular intervals (for example, quarterly) to ensure that each spray head unit 14 is operating and not obstructed. Furthermore, the fire-suppression system is more likely to be embraced by user if it is seen as being more than just a safety system. Moreover, a fire-suppression system is more likely to be installed through choice, if the user has greater control over operation of the system.

Referring to FIGS. 4 to 8, each spray head unit 14 can be provided with an output device 35, for example in the form of a display 35, and an input device 37, for example in the form of a button 37 or a touch panel display, which can be used to provide useful real-time information (i.e., information which is updated, for example, every minute) to the user and/or to allow the user to interact with the spray head unit 14.

Figure 4:
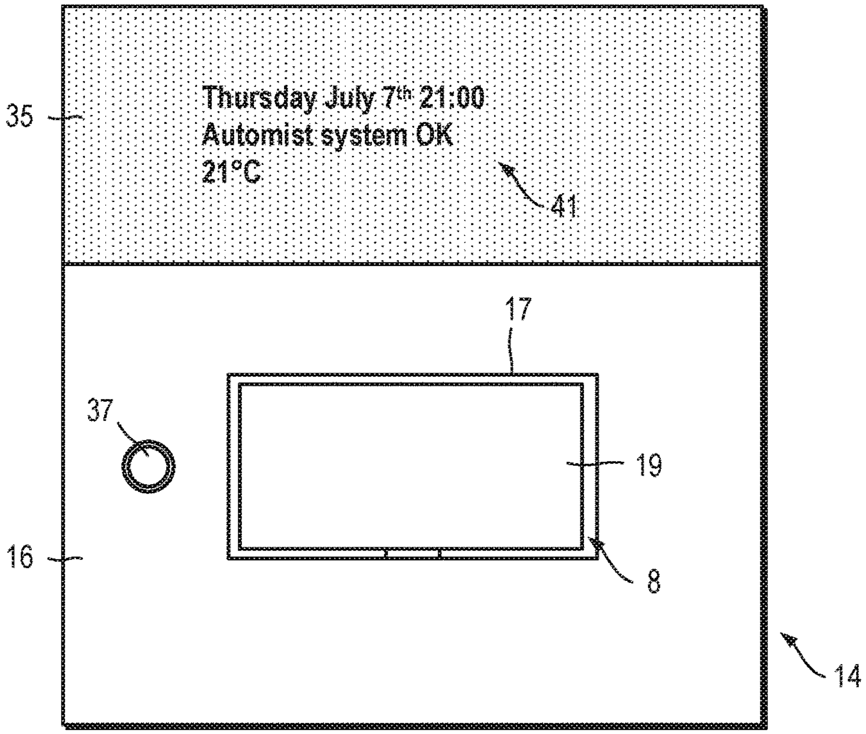
FIG. 4 illustrates a spray head unit having a display showing current date and time, system status and temperature.

Referring to FIG. 4, in a first mode (or "standby mode"), a spray head unit 14 can display a first message 41 which includes the date, time, system status and/or weather report (e.g., temperature). Other types of information may be displayed, such as traffic information, even stock market information. Thus, the user may see the spray head unit 14 as not only a safety device, but as a conveniently-located source of information. This can help avoid items being placed in front of the spray head unit 14. Moreover, it helps confirm that the spray head unit 14 is operational.

Figure 5:
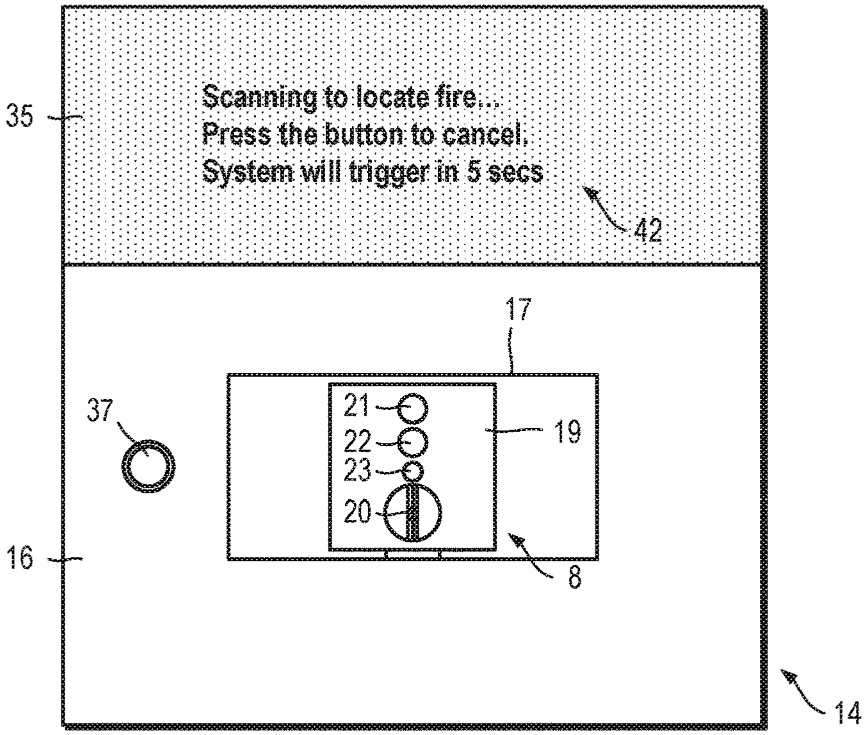
FIG. 5 illustrates a spray head unit having a display showing a message shortly after triggering and before fire-suppressant material is deployed.

Referring to FIG. 5, in a second mode (or "triggered mode"), a spray head unit 14 can display a second message 42, that the unit 14 is scanning to locate the fire, invite the user to cancel deployment of water mist and to provide a countdown. This mode can be triggered by the system 1 and/or by the user, as a test, by pressing the button 37. In the triggered mode, the spray manifold 19 rotates and scans, taking measurements which can be used to identify a potential fire. This can be used to help maintain the spray head unit 14. It may offer a user comfort that it is possible to over-ride the system 1, if necessary.

Figure 6:
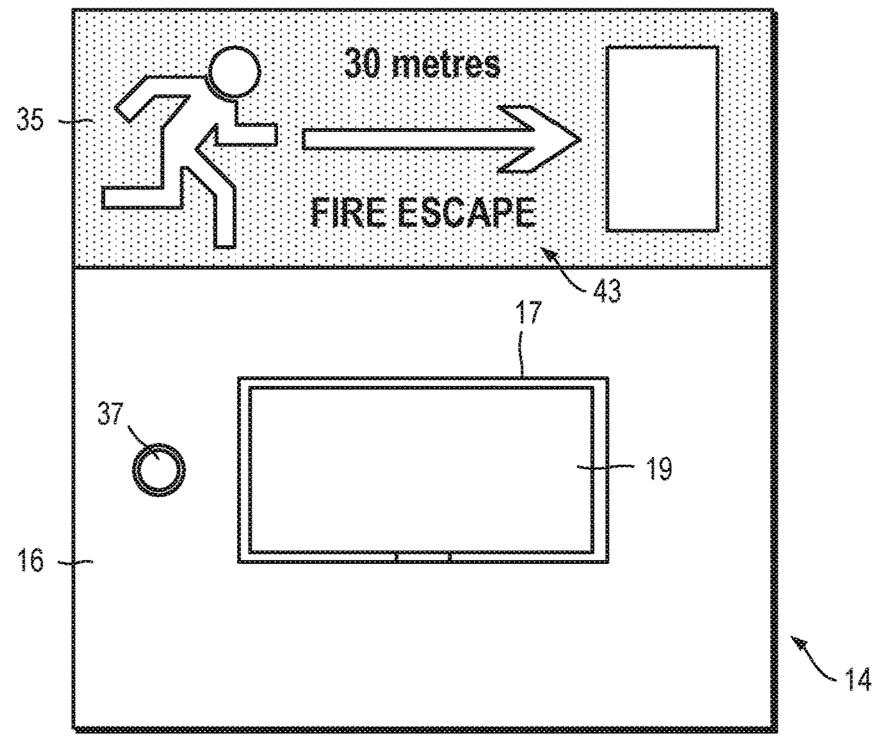
FIG. 6 illustrates a spray head unit having a display providing exit directions.

Referring to FIG. 6, in a third mode (or "fire-escape mode"), the spray head unit 14 can provide a sign for guiding occupants to safety.

Figure 7:
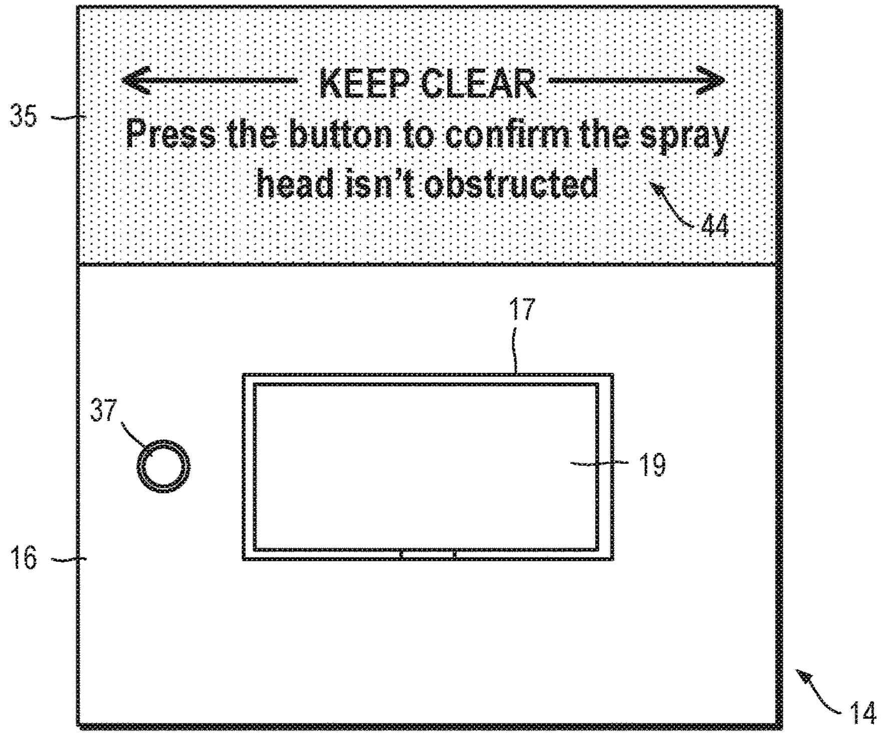
FIG. 7 illustrates a spray head unit having a display showing a message during testing.

Referring to FIG. 7, in a fourth mode (or "test mode"), the spray head unit 14 can be display a message asking a user to press the button 37 and so confirm that the spray head is not obstructed.

Figure 8:
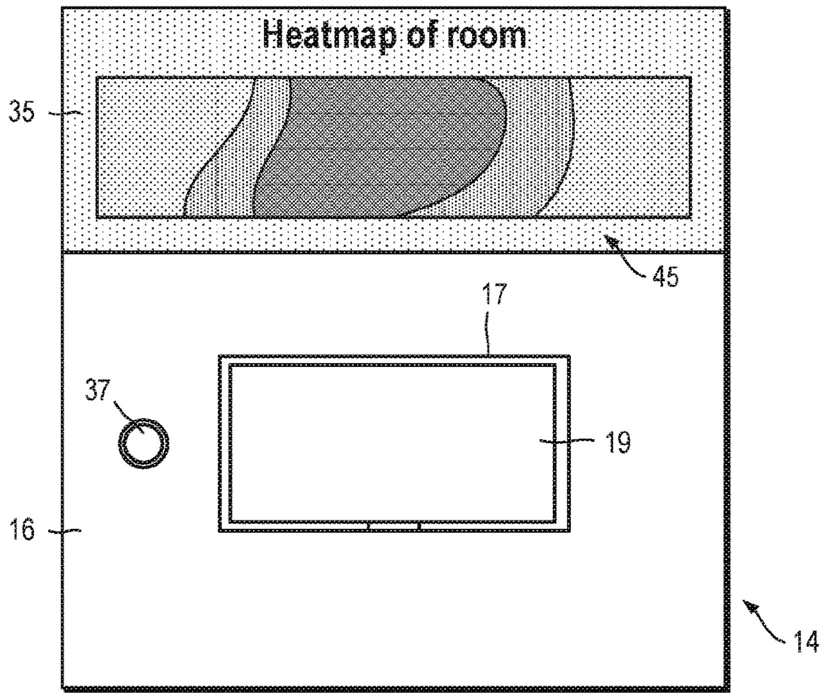
FIG. 8 illustrates a spray head unit having a display showing a heat map of a room in which the spray head unit is installed.

Referring to FIG. 8, in a fifth mode ("heat map mode"), the spray head unit 14 can display a heat map of the room 45. The spray head unit 14 may periodically (e.g. every h hours, for example, where h=24, 12, 8, 4, 2, or 1) or on demand perform a scan using the thermal sensor and generate a heat map of the room. This can help a user to identify cold spots indicating where heat is being lost, such as open windows or hot spots.

Figure 9:
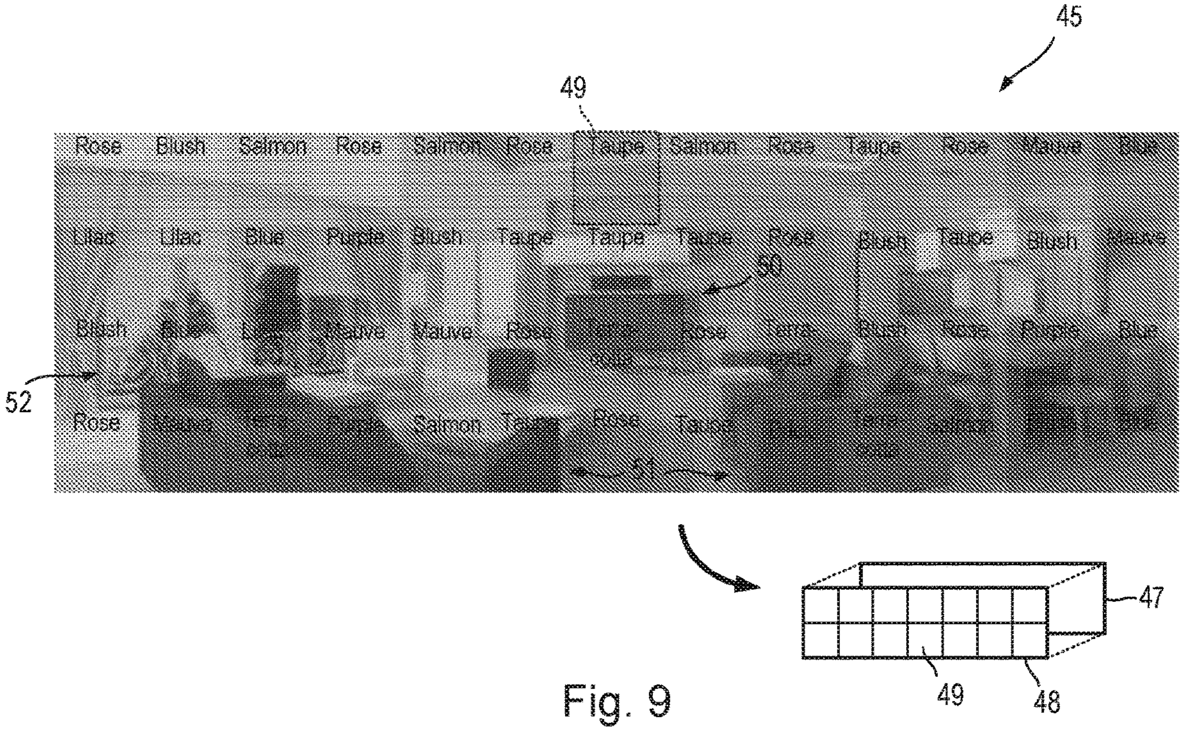
FIG. 9 illustrates a heat map of a room which may be displayed by a spray head unit or on a user device.

The heat map 45 may be a composite image comprising an image of the room 47 and a heat map 48 comprising colour-coded tiles 49 (for example, ranging from red to blue). In FIG. 9, to aid clarity, the colour of each tile 49 is given.

System Management

Figure 10:
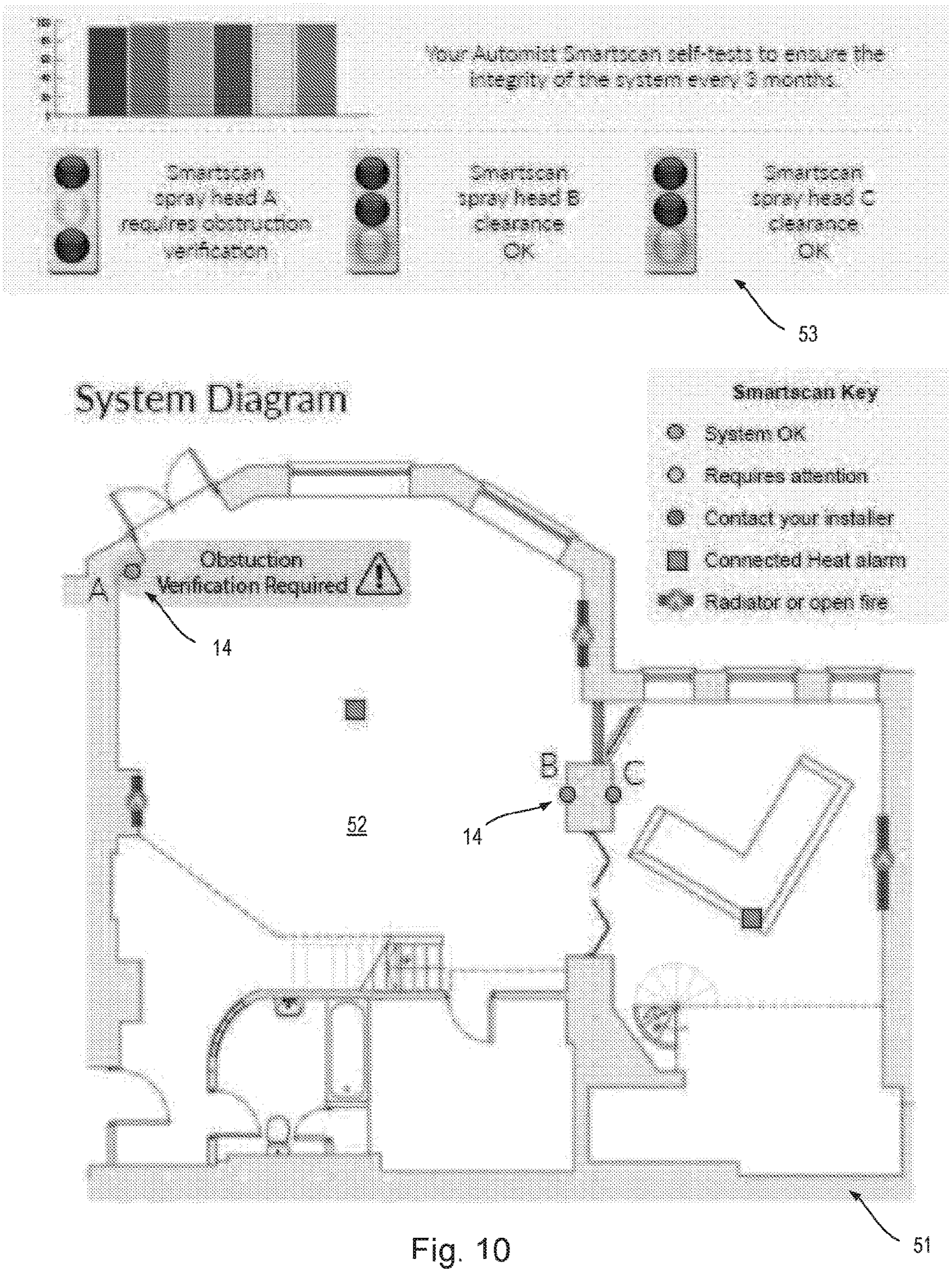
FIG. 10 illustrates a report showing status of the fire suppression system and including a map of a site in which the fire suppression system is installed.

Referring to FIGS. 1 and 10, the system 1 can report its status to a user device, for example, in the form of a report 51 which may be web-based or transmitted to the user, for example, by e-mail.

When the system 1 is installed, a floor plan 52 (or "map") of the dwelling or premises is uploaded to the main controller 3 or the server 13, and locations of spray head units 14 are recorded.

The main controller 3 or server 13 generates a report 51, e.g. periodically (for instance every quarter), in response to a request and/or in response to an event and provides the report 51 which shows the location and status of each spray head unit 14. The status of each spray head unit 14 can be represented using a traffic light colour system. For instance, green can represent proper working order (or "OK"), yellow may indicate that attention is required, such as a test is required, and red may indicate a possible fault or the need for a technician to inspect the unit. The report 51 may provide a provide a dashboard 53 providing a summary of the statuses of the spray head units 14 and system statistics.

Figure 11:
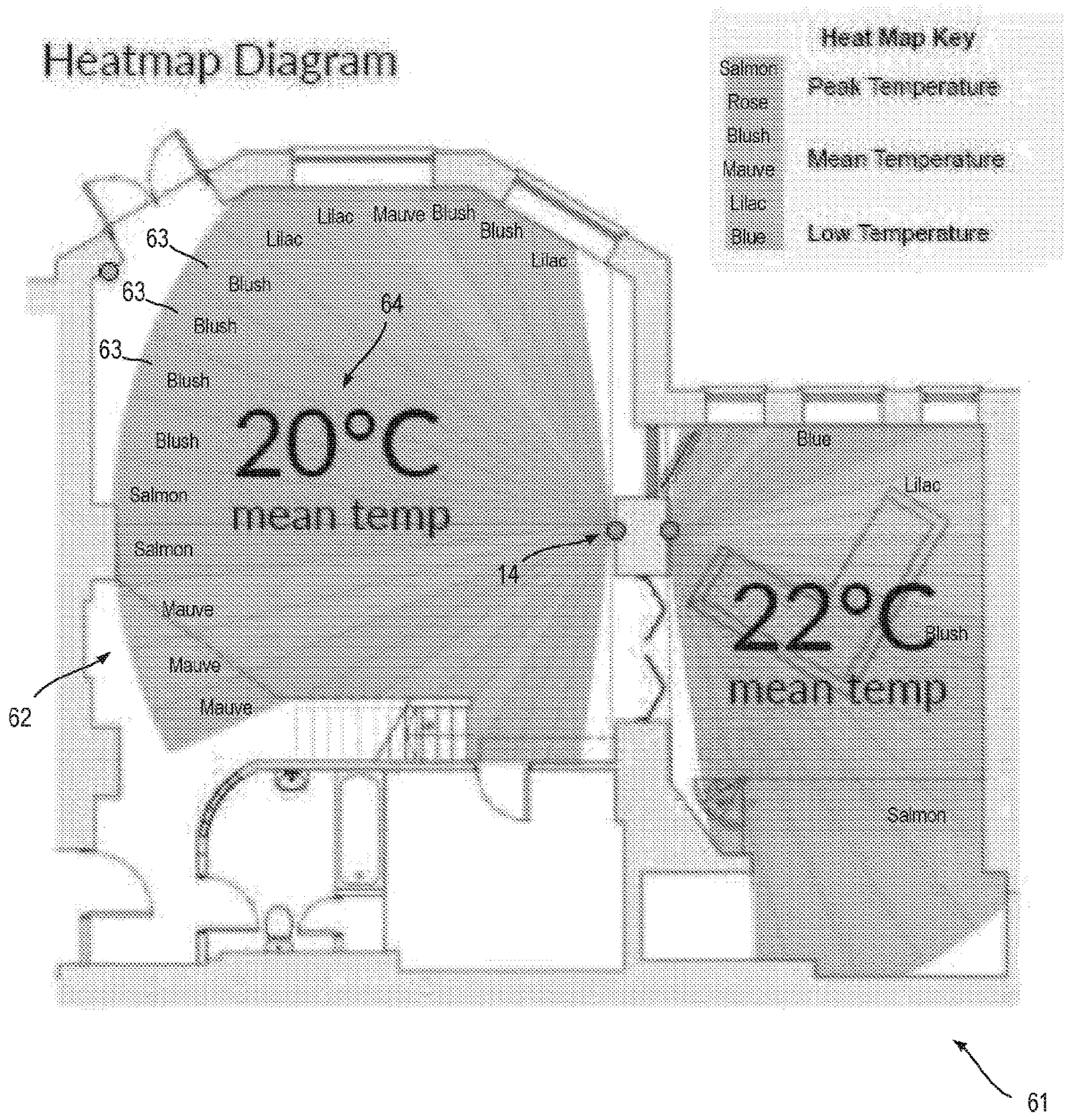
FIG. 11 illustrates a heat map of a site in which the fire suppression system is installed.

Referring to FIGS. 1 and 11, the system 1 can report temperature information to a user device in the form of a heat map report 61 which may be web-based or transmitted to the user, for example, by e-mail.

When the system 1 is installed, a floor plan 52 (or "map") of the dwelling or premises is uploaded to the main controller 3 or the server 13, and locations of spray head units 14 are recorded.

The main controller 3 or server 13 generates a report 61, e.g. periodically (for instance every day), in response to a request and/or in response to an event and provides the report 61 which shows the location and a fan-like, colour-coded map 62 comprising sectors 63 whose colour indicates absolute or relative temperature measured by each spray head unit 14. In FIG. 11, to aid clarity, the colour of sectors 63 is labelled. The report 61 may also provide a mean temperature 64.

Prioritised Water Mist Deployment

Referring to FIG. 5, the spray head unit 14 has a feature that, since the nozzle 20 is angularly aligned with sensors 21, 22, 23 then as the spray head 8 scans a room and locates a fire at a given angle (or "first angular position") using a sensor 21, 22, 23, then the nozzle 20 is already in position to deploy the water mist.

The spray head controller 26, however, can be programmed to deploy water mist at other angular positions first, before returning to the fire and deploying water mist towards the fire itself. There may be two reasons for following this approach. First, it might be preferable to provide protective cover, for example, over an occupant in the room or over fire-hazardous articles, such as gas pipes, in the room. Alternatively, rather than provide water mist directly over the subject, a protective barrier region of water mist may be provided between the fire and the subject.

Figure 12:
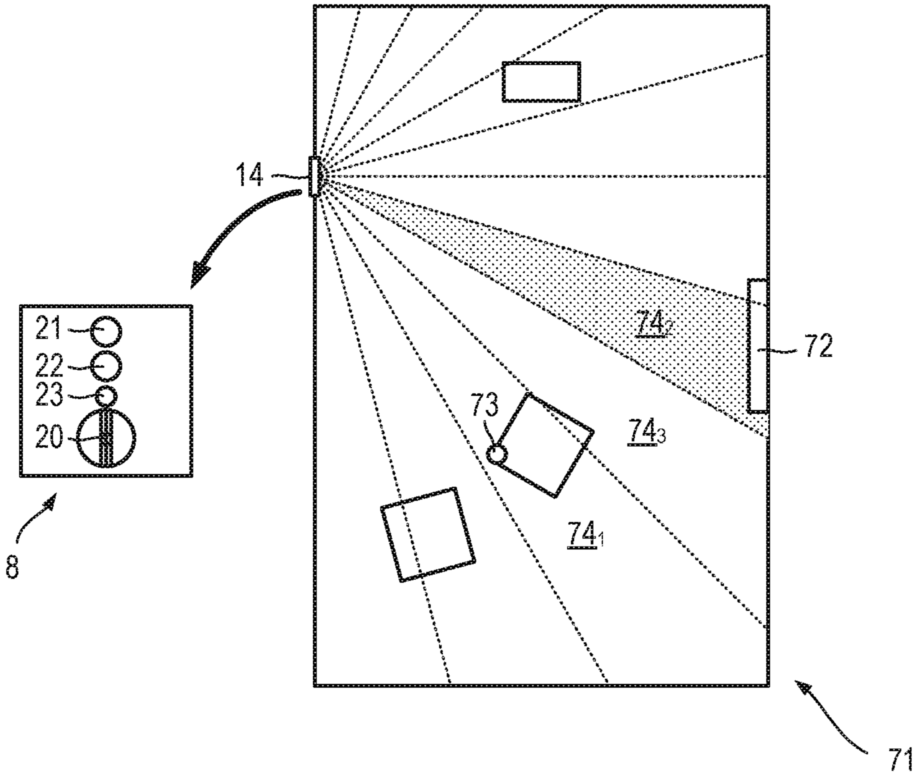
FIG. 12 illustrates a room having a high-priority sector.

Referring to FIG. 12, a room 71 fitted with a spray head unit 14 may include a gas fire 72. A fire 73 may be detected in a first sector $\mathbf{74}_1$ (i.e., at a first angular position). However, spray head 8 may move and deploy water mist first in a second sector $\mathbf{74}_2$ (i.e., at a second angular position) in which the gas fire 72 is located (for example, activating for, say 5 or 10 seconds), before moving back and deploying water mist in the first sector $\mathbf{74}_1$. Alternatively, the spray head 8 may move and deploy water mist first in a third sector $74_3$ (i.e., at a third angular position) between the gas fire 72 and the fire 73, before moving back and deploying water mist in the first sector $74_1$.

Angle-Dependent Threshold

Figure 13:
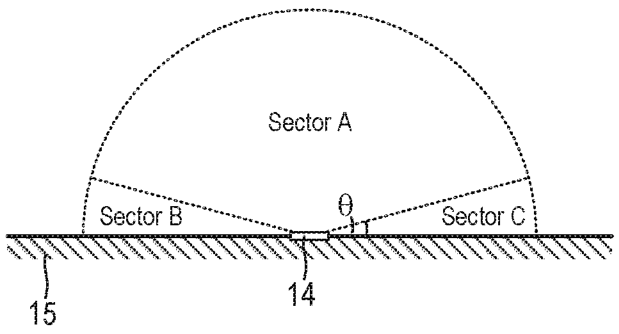
FIG. 13 illustrates first, second and third sectors scannable by a spray head unit.

Referring to FIG. 13, the proximity of a wall 15 can lead to edge effects which may make a fire easier to detect. For example, heat, smoke, light or sound can be reflected by wall 15.

Figure 14:
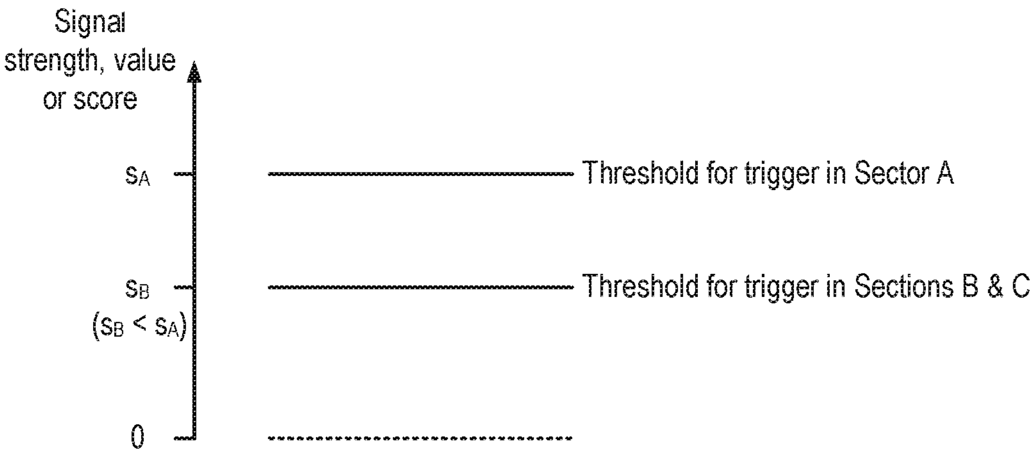
FIG. 14 illustrates a first trigger threshold for the first sector shown in FIG. 13 and a second trigger threshold for second and third sectors shown in FIG. 13.

Referring also to FIG. 14, the controller 26 (FIG. 3) may take into account the angular position of the spray head 8 when determining whether a fire is present. For example, for angular positions close to the wall (for example, $\theta \le 10°$) then a lower threshold (at or above which a signal, value or score is considered to indicate the presence of a fire) may be used. For example, the value may be a temperature value. The score may be a confidence level of an image or pattern recognition process.

Position of Axis of Rotation of the Spray Head

Figure 15:
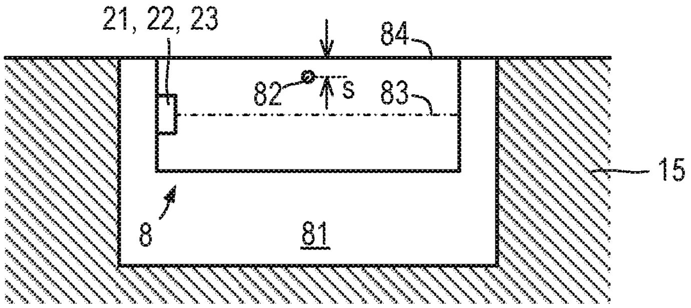
FIG. 15 is a plan view of a rotatable spray head assembly when parked.

Referring to FIG. 15, in standby mode, the spray head 8 is housed in recess 81 in the wall 15. To help the sensors 21, 22, 23 to monitor the room close to the wall, the spray head 8 may turn on an axis 82 which is located between the central plane 83 (or "median plane") and lateral side 84 of the spray head 8, which is flush with the wall 15.

Figure 16:
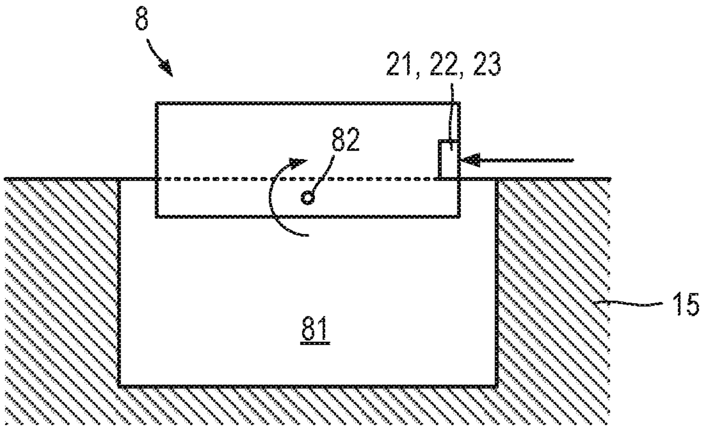
FIG. 16 is a plan view of the rotatable spray head assembly shown in FIG. 15 when deployed.

Referring also to FIG. 16, the position of the axis 82 means that when the spray head 8 is activated and rotates, the spray head 8 protrudes from the wall 15 further compared to when the axis runs through the central plane 83. This can help the sensors 21, 22, 23 to see more of the room, at least to one side of the spray head unit 14.

Hydrophobic Lens Coating

Referring to FIG. 1, the system 1 may alternate between sensing and deploying water mist. Thus, water mist which is sprayed may come to settle on a sensor 21, 22, 23 and, thus, impede the sensor's ability to sense.

Figure 17:
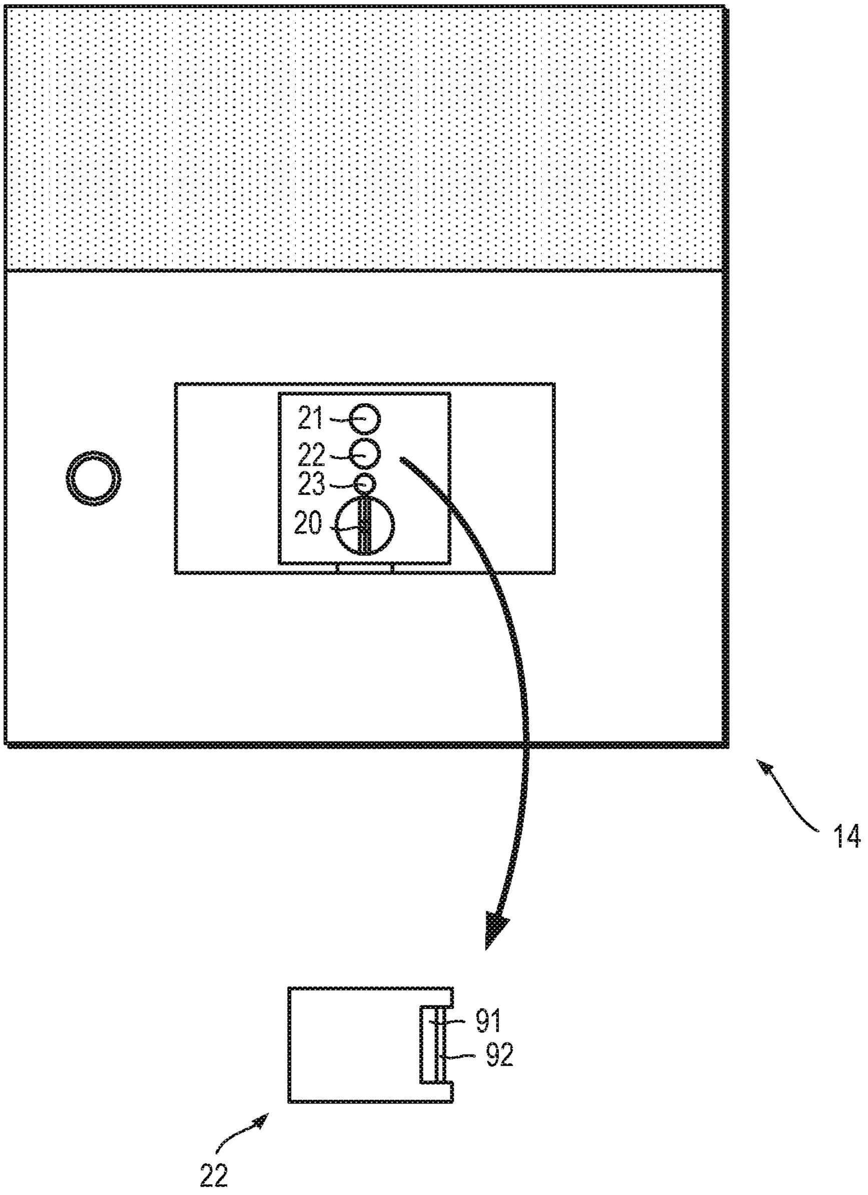
FIG. 17 illustrates a spray head unit having a camera having a lens which is coated in a hydrophobic layer.

Referring to FIG. 17, taking the example of a visible light camera 22, the camera 22 has a lens 91 which is coated with a layer 92 of hydroscopic material 92.

Use of Additives

Figure 18:
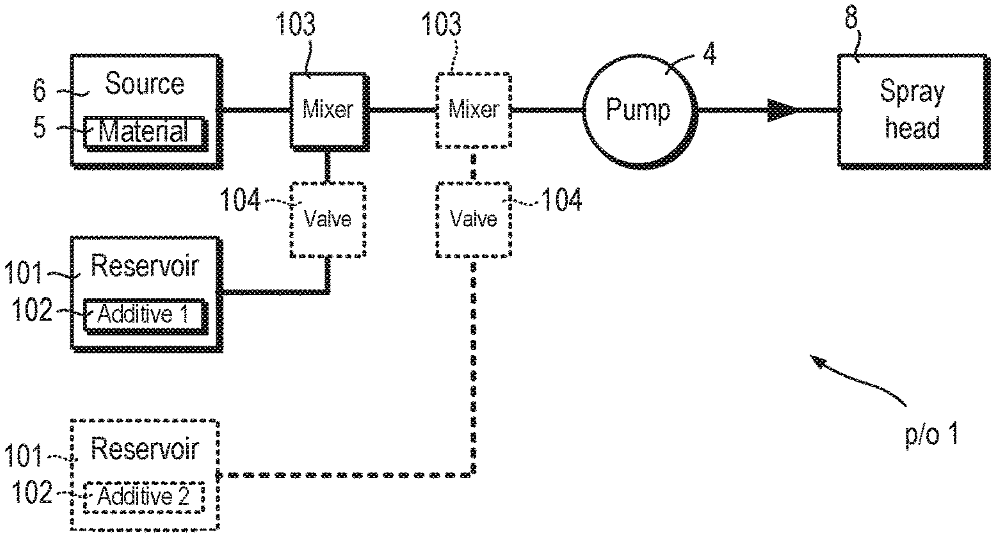
FIG. 18 shows part of a fire suppression system including reservoir(s) and first arrangement(s) for providing additives, such as security markers or perfume.

Referring to FIG. 18, the system 1 may include reservoirs 101 of additives 102, and mixers 103 and/or valves 104 for providing additives to the fire-suppressant material, which preferably takes the form of water. The additives 102 may take the form of a security marker, perfume and/or wetting agent. The reservoirs 11 may be provided in a unit which contains the main controller 3 and pump 4. In some cases, the reservoirs can be provided in the spray heads 8. The same nozzle can be used for fire suppression and other for other different non-fire suppression uses, such as security marking and humidification. Alternatively, different lines and different nozzles can be used. An example of a system in which an additive can be introduced into water is given in WO 2015/49500 A1 which is incorporated herein by reference.

Humidification can be carried out periodically, e.g. daily or weekly, and/or on demand by the user by activating a menu (not shown) displayed on display 35 (FIG. 3) and selected using switches 37 (FIG. 3).

Figure 19:
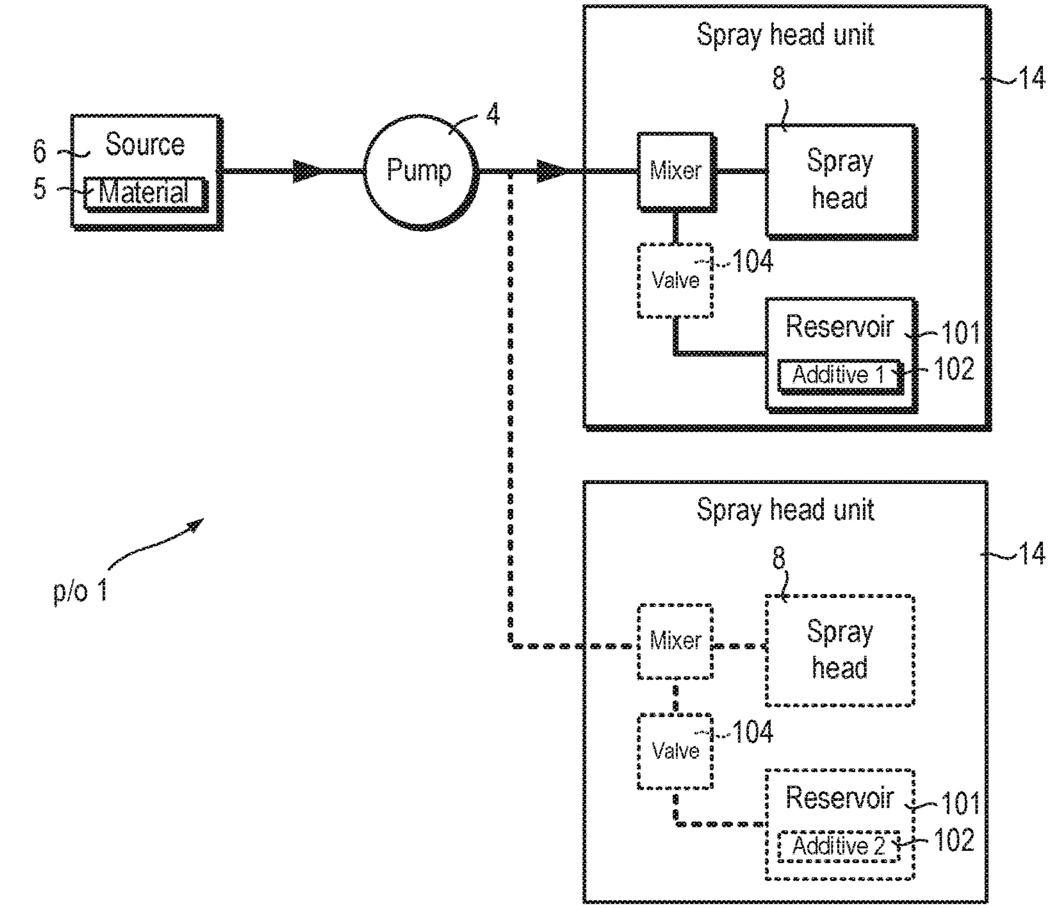
FIG. 19 shows part of a fire suppression system including reservoir(s) and second arrangement(s) for providing additives, such as security markers or perfume.
Figure 20:
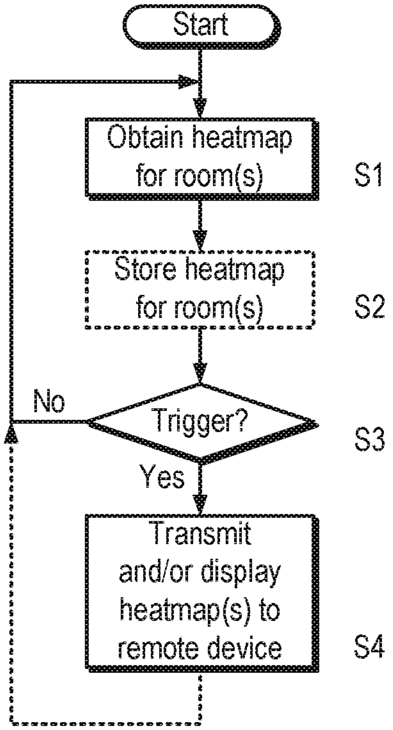
FIG. 20 illustrates transmission or display of heat maps to aid firefighters.

Referring to FIG. 19, a reservoir 101 of additive 102 may be provided in the spray head unit 14. For the example, the reservoir 101 may take the form of a capsule or cartridge which, once spent, can be replaced with a fresh capsule or cartridge. The cartridge may be pressurised. The reservoir 101 may, however, may take the form of a small tank which can be filled or topped up through a port or hole which may be closed, for example, with a screw cap. More than one reservoir may be provided in the spray head unit 14.

The spray head face plate 16 (FIG. 2) may be removed to access the reservoir. Alternatively, the capsule or cartridge 101 may be inserted through a loading slot, aperture or opening (not shown) in the face plate 16 (FIG. 2) having a sprung- or actuated-flap (not shown).

Other Safety-Related Uses

Referring to FIGS. 1 and 120, the system 1 may gather and optionally record information about location of occupants (steps S1 & S2), which may be identified since they have a heat signature). In response to a trigger, such as activation of the system 1 (i.e., detection of a fire) or in response to a user request (which may be a fire fighter), this information may be provided to a display for example display 35 (FIG. 3) for providing on-site information, or transmitted to a remote device, such as a portable computer (for example in the form of a tablet computer), which can be used to help guide fire fighters (steps S3 & S4).

The system 1 may gather and optionally record information about heat profile for a room. This information may be provided to a display, for example display 35 (FIG. 3), or transmitted via network 11 (FIG. 1), to help control air flow in a building for smote venting. The information may be provided to a ventilation system controller (not shown) for controlling air flow in a building. The spray head units 14 may be connected such that the heat map for one room may be display on the display 35 of a spray head unit 14 in another different room. Thus, a firefighter can look at a display 35 (FIG. 3) and survey other rooms before proceeding.

Modifications

It will be appreciated that various modifications may be made to the embodiments hereinbefore described. Such modifications may involve equivalent and other features which are already known in the design, manufacture and use of fire-suppression systems and component parts thereof and which may be used instead of or in addition to features already described herein. Features of one embodiment may be replaced or supplemented by features of another embodiment.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A wall-mountable spray head unit comprising:
- a rotatable spray head assembly which comprises:
  - a spray manifold rotatable about a first axis; and
  - a spray nozzle supported by the spray manifold and orientated to deliver fire-suppressant material radially in a plane defined by the first axis and a second axis which is perpendicular to the first axis;
- one or more fire-locating sensors;
- at least one output device including a first output device, wherein the at least one output device is integrated into a faceplate of the wall-mountable spray head unit;
- a controller configured to cause the first output device to output real-time information; and at least one input device including a first input device integrated into the faceplate, wherein the spray head unit is configured to cease deployment of the fire-suppressant material in response to a user input to the first input device within a pre-set period.

2. The spray head unit of claim 1, wherein the first output device (35) is a display.

3. The spray head unit of claim 1, wherein the real-time information includes a current time and/or a weather report.

4. The spray head unit of claim 1, wherein the real-time information includes information regarding a system check.

5. The spray head unit of claim 1, wherein the real-time information includes exit directions.

6. The spray head unit of claim 1, wherein the real-time information includes a heat map (45).

7. The spray head unit of claim 6, wherein the real-time information includes an image of the room and a heat map of the room.

8. The spray head unit of claim 1, having different modes and the controller is operable to output different information in different modes.

9. The spray head unit of claim 1, wherein the first input device (37) comprises a push button or a touch switch, or a touch screen.

10. The spray head unit of claim 1, configured to determine whether a user, in response to a prompt, has provided an input to the first input device.

11. The spray head unit of claim 10, wherein the spray head unit is configured to determine whether the user, in response to the prompt, has provided the input to the first input device within a given time period.

12. The spray head unit of claim 1, comprising: a controller configured to cause deployment of fire-suppressant material in response to a trigger, wherein a threshold for the trigger depends on an angle of rotation of the spray manifold.

13. The spray head unit of claim 1, comprising:

a controller configured to deploy fire-suppressant material in response to a triggering event at a first angular position, wherein the controller is configured to deploy the fire-suppressant material at a second, different, predetermined angular position before the first angular position.

14. The spray head unit of claim 13, wherein a subject or article of importance is located at the second, different angular position.

15. The spray head unit of claim 1, wherein the second, different angular position intersects the first angular position and a third angular position at which a subject or article is located.

16. A system comprising:

the wall-mountable spray head unit of claim 1;

wherein the one or more fire-locating sensors including a thermal sensor, wherein the room is scannable with the thermal sensor so as to generate a heat map of the room.

17. The system of claim 16, wherein the first output device is a display, wherein the wall-mountable spray head unit is configured to show the heat map.

18. A wall-mountable spray head unit comprising:

a rotatable spray head assembly which comprises:

a spray manifold rotatable about a first axis; and a spray nozzle supported by the spray manifold and orientated to deliver fire-suppressant material radially in a plane defined by the first axis and a second axis which is perpendicular to the first axis; and one or more fire-locating sensors including a visible-light camera, or a microphone, or both a visible-light camera and a microphone;

at least one output device including a first output device, wherein the at least one output device is integrated into a faceplate of the wall-mountable spray head unit;

a controller configured to cause the first output device to output real-time information; and at least one input device including a first input device integrated into the faceplate, wherein the spray head unit is configured to cease deployment of the fire-suppressant material in response to a user input to the first input device within a pre-set period.

19. The spray head unit of claim 18, wherein the one or more fire-locating sensors includes a thermal sensor.

20. The spray head unit of claim 18, wherein at least one of the one or more fire-locating sensors is/are directed in the plane.

21. The spray head unit of claim 20, wherein all of the one or more fire-locating sensors is/are directed in the plane.

22. The spray head unit of claim 18, wherein the one or more fire-locating sensors is/are mounted on the spray manifold so as to move with the spray nozzle.

23. The spray head unit of claim 18, wherein the first axis is a substantially vertical axis and the plane is a substantially vertical plane.

24. The spray head unit of claim 18, wherein the spray manifold is only rotatable about the first axis.

25. The spray head unit of claim 18, wherein the visible-light camera comprises a lens and a hydrophobic coating on the lens.

26. A wall-mountable spray head unit comprising:

a rotatable spray head assembly which comprises:

a spray manifold rotatable about a first axis; and a spray nozzle supported by the spray manifold and orientated to deliver fire-suppressant material radially in a plane defined by the first axis and a second axis which is perpendicular to the first axis;

one or more fire-locating sensors;

a controller configured to cause deployment of fire-suppressant material in response to a trigger, wherein a threshold for the trigger depends on an angle of rotation of the spray manifold;

at least one output device including a first output device, wherein the at least one output device is integrated into a faceplate of the wall-mountable spray head unit, and wherein the controller is configured to cause the first output device to output real-time information; and at least one input device including a first input device integrated into the faceplate, wherein the spray head unit is configured to cease deployment of the fire-suppressant material in response to a user input to the first input device within a pre-set period.

27. A wall-mountable spray head unit comprising:

a rotatable spray head assembly which comprises:

a spray manifold rotatable about a first axis; and a spray nozzle supported by the spray manifold and orientated to deliver fire-suppressant material radially in a plane defined by the first axis and a second axis which is perpendicular to the first axis;

one or more fire-locating sensors;

a controller configured to deploy fire-suppressant material in response to a triggering event occurring at a first angular position, wherein the controller is configured to deploy the fire-suppressant material at a second, different, angular position before the first angular position and/or before a third, different angular position;

at least one output device including a first output device, wherein the at least one output device is integrated into a faceplate of the wall-mountable spray head unit, wherein the controller is configured to cause the first output device to output real-time information; and at least one input device including a first input device integrated into the faceplate, wherein the spray head unit is configured to cease deployment of the fire-suppressant material in response to a user input to the first input device within a pre-set period.

28. A system comprising:

a wall-mountable spray head unit comprising:

a rotatable spray head assembly which comprises:

a spray manifold rotatable about a first axis; and a spray nozzle supported by the spray manifold and orientated to deliver fire-suppressant material radially in a plane defined by the first axis and a second axis which is perpendicular to the first axis;

one or more fire-locating sensors for locating a fire in a room, the one or more fire-locating sensors including a thermal sensor, wherein the room is scannable with the thermal sensor so as to generate a heat map of the room;

at least one output device including a first output device, wherein the at least one output device is integrated into a faceplate of the wall-mountable spray head unit;

a controller configured to cause the first output device to output real-time information; and at least one input device including a first input device integrated into the faceplate, wherein the spray head unit is configured to cease deployment of the fire-suppressant material in response to a user input to the first input device within a pre-set period.

29. The system of claim 28, wherein the wall-mountable spray head unit further comprises:

a network interface for transmitting the heat map to a remote location.

30. The system of claim 28, further comprising:

a server configured to store the heat map and to serve the heat map to a client device.

* * * * *